(12) United States Patent
Ma

(10) Patent No.: US 9,658,716 B2
(45) Date of Patent: May 23, 2017

(54) METHOD AND DEVICE OF DEACTIVATING PORTION OF TOUCH SCREEN TO PREVENT ACCIDENTAL ACTIVATION

(71) Applicant: SHENZHEN SEEFAA SCITECH CO., LTD., Shenzhen OT (CN)

(72) Inventor: Zhigang Ma, Northville, MI (US)

(73) Assignee: SHENZHEN SEEFAA SCITECH CO., LTD., Shenzhen (CN)

( * ) Notice: Subject to any disclaimer, the term of this patent is extended or adjusted under 35 U.S.C. 154(b) by 177 days.

(21) Appl. No.: 13/765,649

(22) Filed: Feb. 12, 2013

(65) Prior Publication Data

US 2014/0225857 A1 Aug. 14, 2014

(51) Int. Cl.
*G06F 3/01* (2006.01)
*G06F 3/041* (2006.01)

(52) U.S. Cl.
CPC ............ *G06F 3/0418* (2013.01); *G06F 3/017* (2013.01)

(58) Field of Classification Search
CPC . G06F 3/01; G06F 3/033; G06F 3/048; G06F 3/0481; G06F 3/04812; G06F 3/04817; G06F 3/04842; G06F 3/0482; G06F 3/0488
See application file for complete search history.

(56) References Cited

U.S. PATENT DOCUMENTS

| | | | |
|---|---|---|---|
| 9,128,580 B2 * | 9/2015 | Kawalkar | G06F 3/048 |
| 2006/0238517 A1 * | 10/2006 | King et al. | 345/173 |
| 2009/0174679 A1 * | 7/2009 | Westerman | 345/173 |
| 2010/0127995 A1 * | 5/2010 | Rigazio et al. | 345/173 |
| 2010/0207894 A1 * | 8/2010 | Tsuei | 345/173 |
| 2010/0257447 A1 * | 10/2010 | Kim | G06F 3/04883 715/702 |
| 2012/0242591 A1 * | 9/2012 | Kawalkar | 345/173 |
| 2012/0262407 A1 * | 10/2012 | Hinckley | G06F 3/038 345/173 |
| 2013/0257793 A1 * | 10/2013 | Zeliff et al. | 345/174 |
| 2013/0335335 A1 * | 12/2013 | Neelakant | G06F 3/04883 345/173 |
| 2014/0210727 A1 * | 7/2014 | Wassingbo | 345/173 |
| 2014/0215336 A1 * | 7/2014 | Gardenfors | G06F 3/017 715/719 |

* cited by examiner

*Primary Examiner* — Kent Chang
*Assistant Examiner* — William Lu
(74) *Attorney, Agent, or Firm* — Hemisphere Law, PLLC

(57) ABSTRACT

Upon receiving a certain type of signal in a touch screen device, deactivate a portion of the touch screen, and position the deactivated portion on a edge of the touch screen such that a user can hold the touch screen device with the thumb resting on the deactivated portion, without accidentally activating icons or active links on the touch screen. The deactivated portion can be moved, cloned, and cancelled after non-use.

18 Claims, 12 Drawing Sheets

Figure 1:
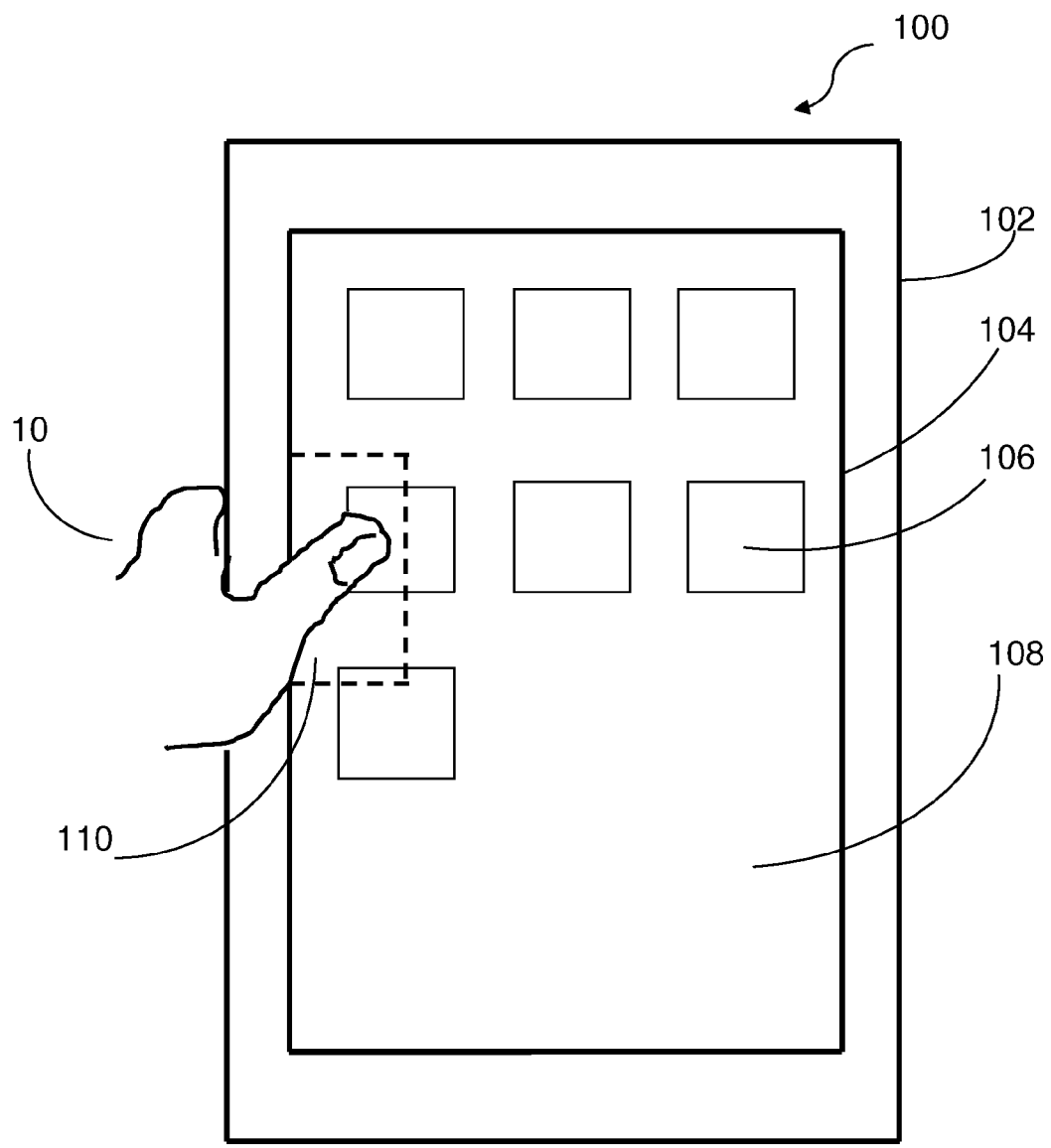

METHOD AND DEVICE OF DEACTIVATING PORTION OF TOUCH SCREEN TO PREVENT ACCIDENTAL ACTIVATION

CROSS-REFERENCE TO RELATED APPLICATIONS

None.

BACKGROUND OF THE INVENTION

1. Field of the Invention

This disclosure generally relates to a method for touch screen devices and, particularly, to a method for deactivating a portion of a touch screen of a touch screen device such that a user thereof can hold the device firmly and conformably by resting the thumb on the deactivated portion, without accidentally activating the touch screen, and a touch screen device employing the method.

2. Description of Related Art

Touch screen devices, such as tablet computers and smartphones, are ubiquitous nowadays. Device makers are trying to make the touch screen on the device larger and larger while providing ever-shrinking edges surrounding the touch screen, in attempts to please customers by make the device more aesthetically appealing. However, for such computing devices, more often than not, a user needs to hold the device by using one hand to hold one side of the tablet computer, or two hands to hold two opposite sides of the tablet computer in using them. A problem ensues. If the edges surrounding the touch screen is too narrow, the thumb of a holding hand would have to go beyond the edge of the side onto the touch screen, for the user to comfortably hold the tablet computer, and if there are touch-sensitive areas, such as icons of applications or hyperlinks adjacent to the edge, the thumb could accidently activate such touch-sensitive areas, thus disturbing what is currently going on with the device.

Therefore, it would be desirable to provide a new touch screen that a user can comfortably and firmly hold, yet avoid unwanted activation of a function on the touch screen.

BRIEF SUMMARY OF THE INVENTION

A method for deactivating a portion of a touch screen is provided. When a designated touch-sensitive area is touched for certain duration of time, or certain signal is received, a portion on the touch screen which covers the point of the touch and the surrounding area will be deactivated, such that a user can hold the device by resting his thumb on the deactivated portion and any other touch-sensitive areas covered by the deactivated portion will not be accidentally activated by the holding hand. The deactivated portion can be located adjacent to an edge of the touch screen such that the device would be easier to be hold by a human hand without accidentally triggering other touch-sensitive areas covered by the deactivated portion.

A device implementing this method is also provided. The device includes a touch screen which defines a designated touch-sensitive area to be touched to trigger the deactivation of a portion covering the point of the touch. The device also includes a signal receiving module to sense the touch and a processor module to render the deactivated portion.

BRIEF DESCRIPTION OF THE SEVERAL VIEWS OF THE DRAWING(S)

Figure 2:
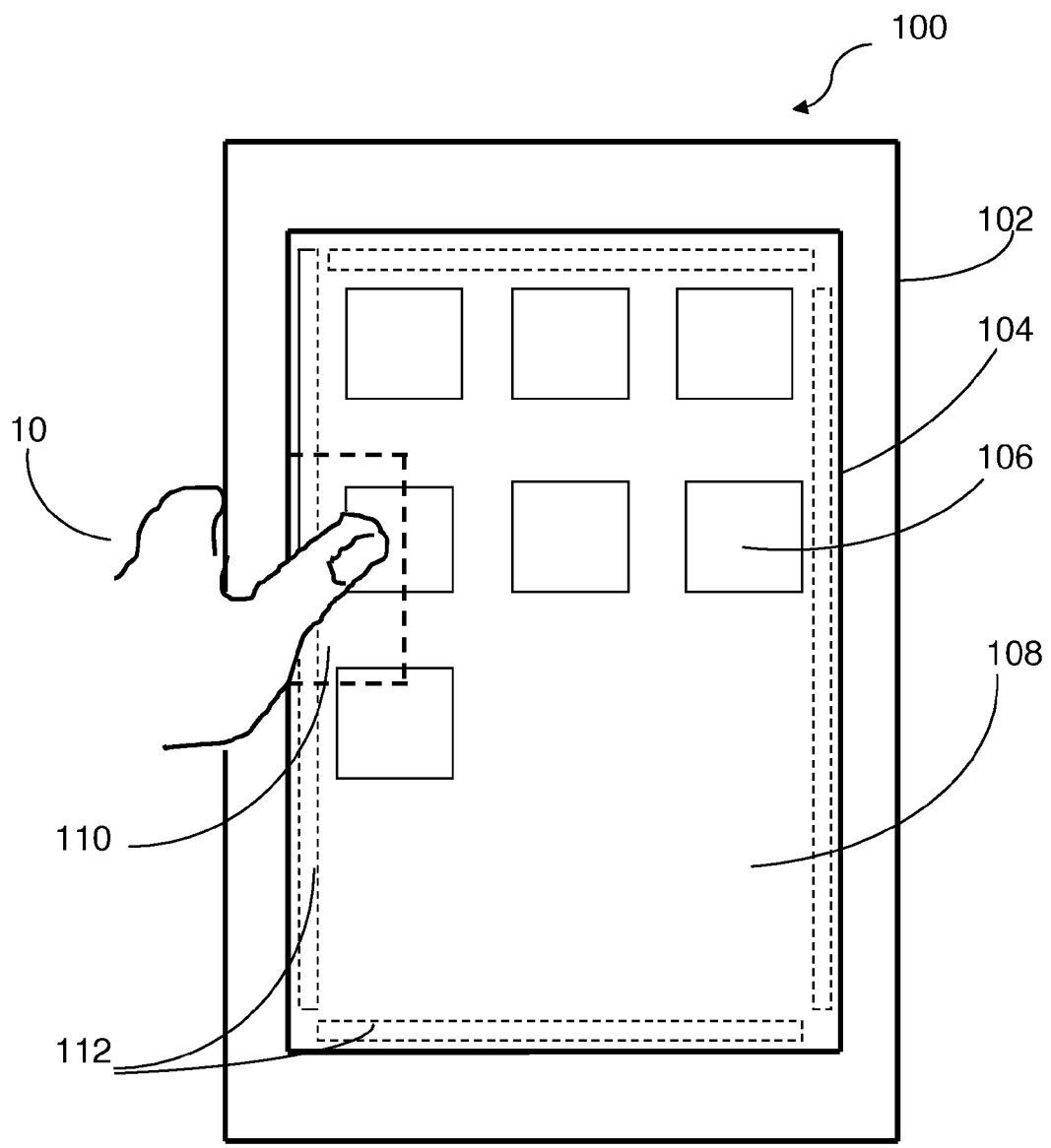
Figure 3:
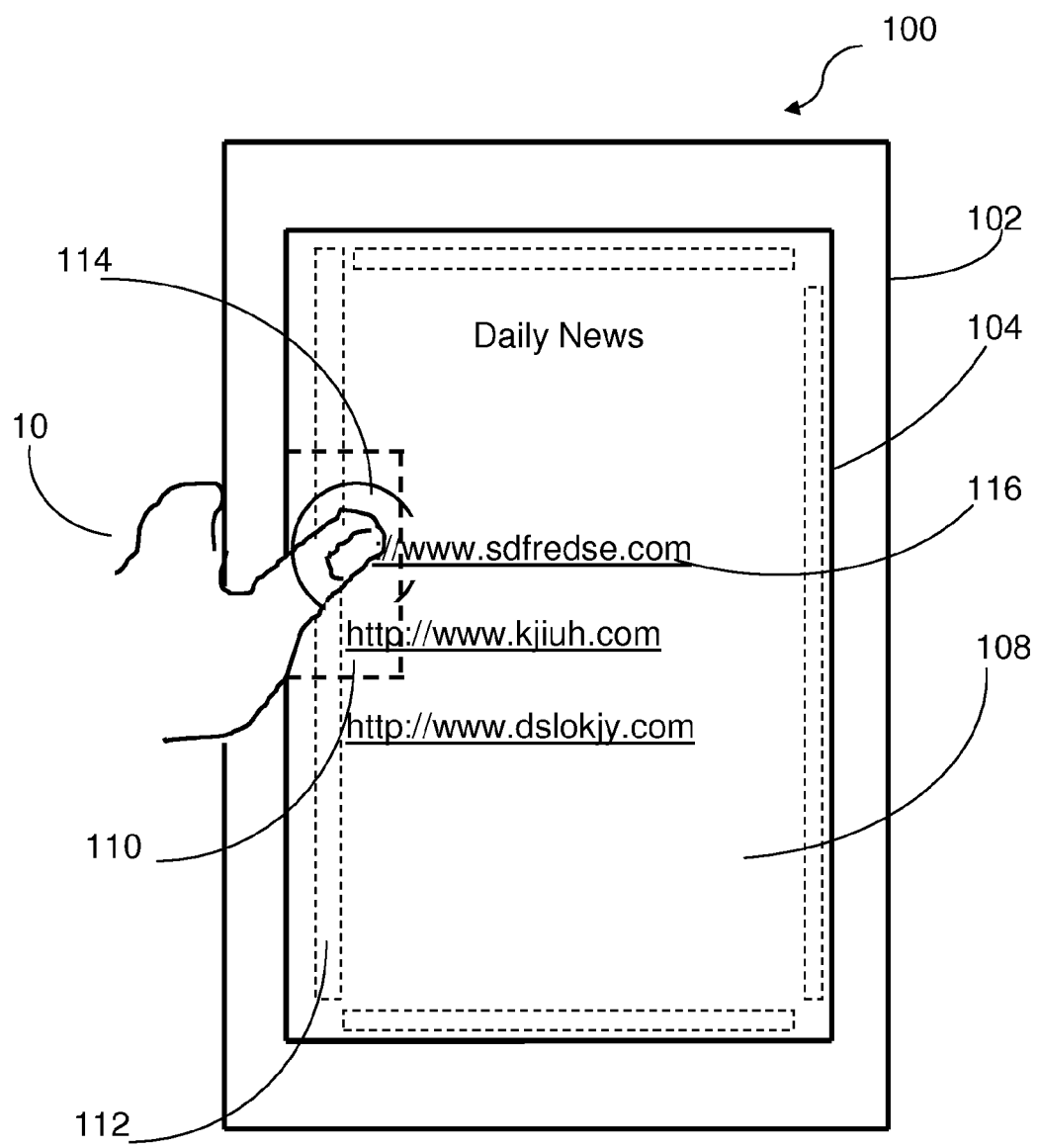
Figure 4:
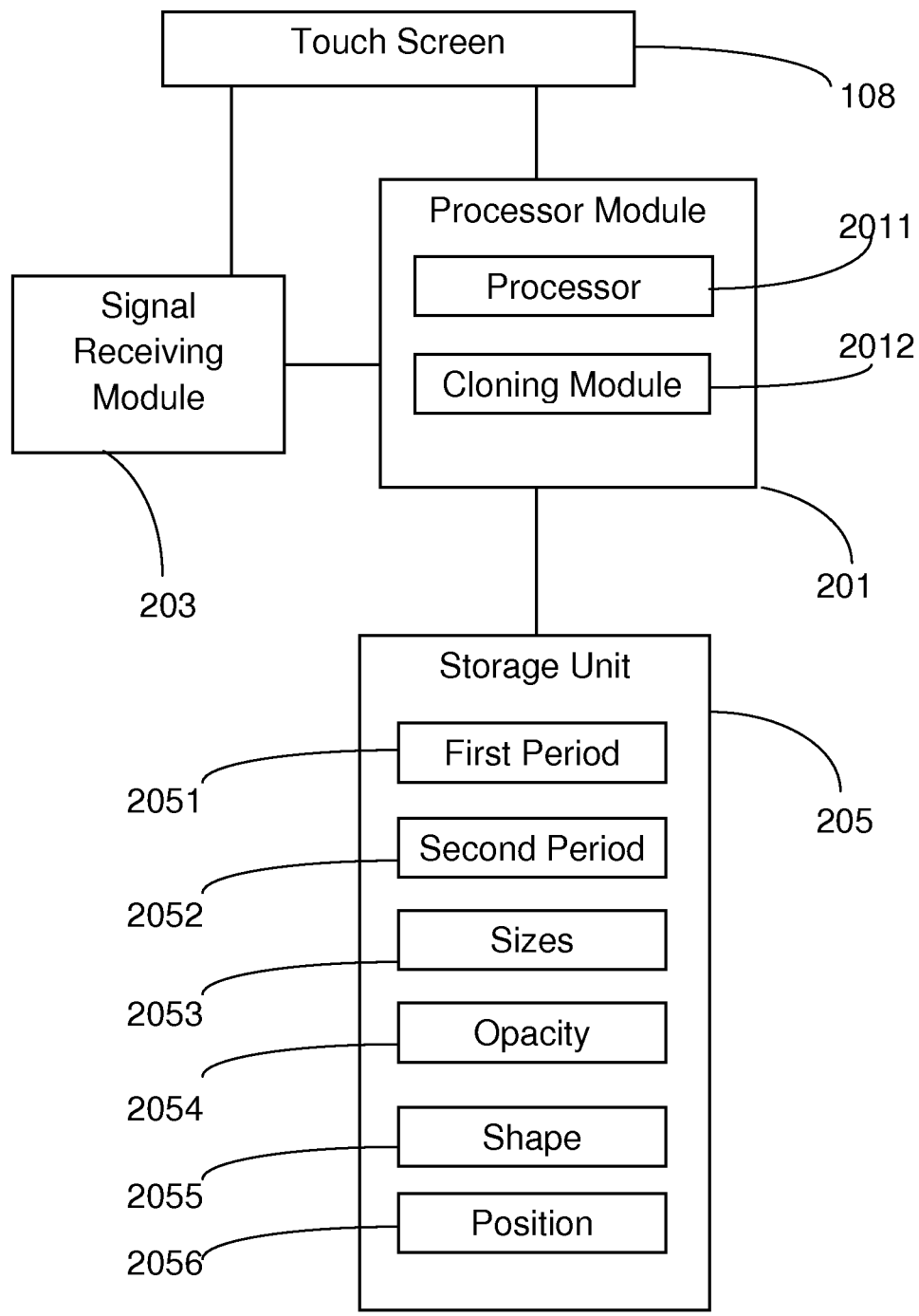
Figure 5:
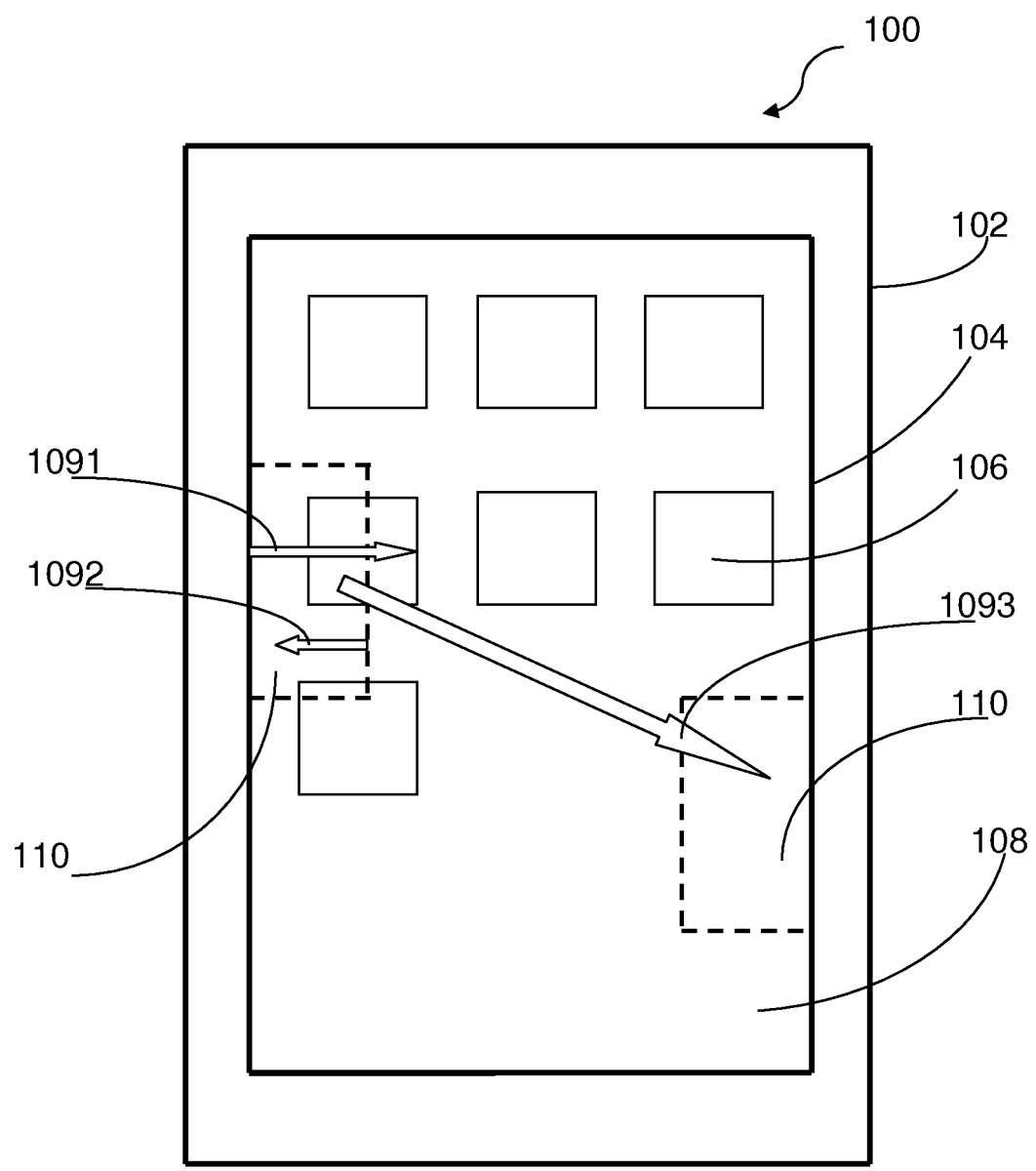
Figure 6:
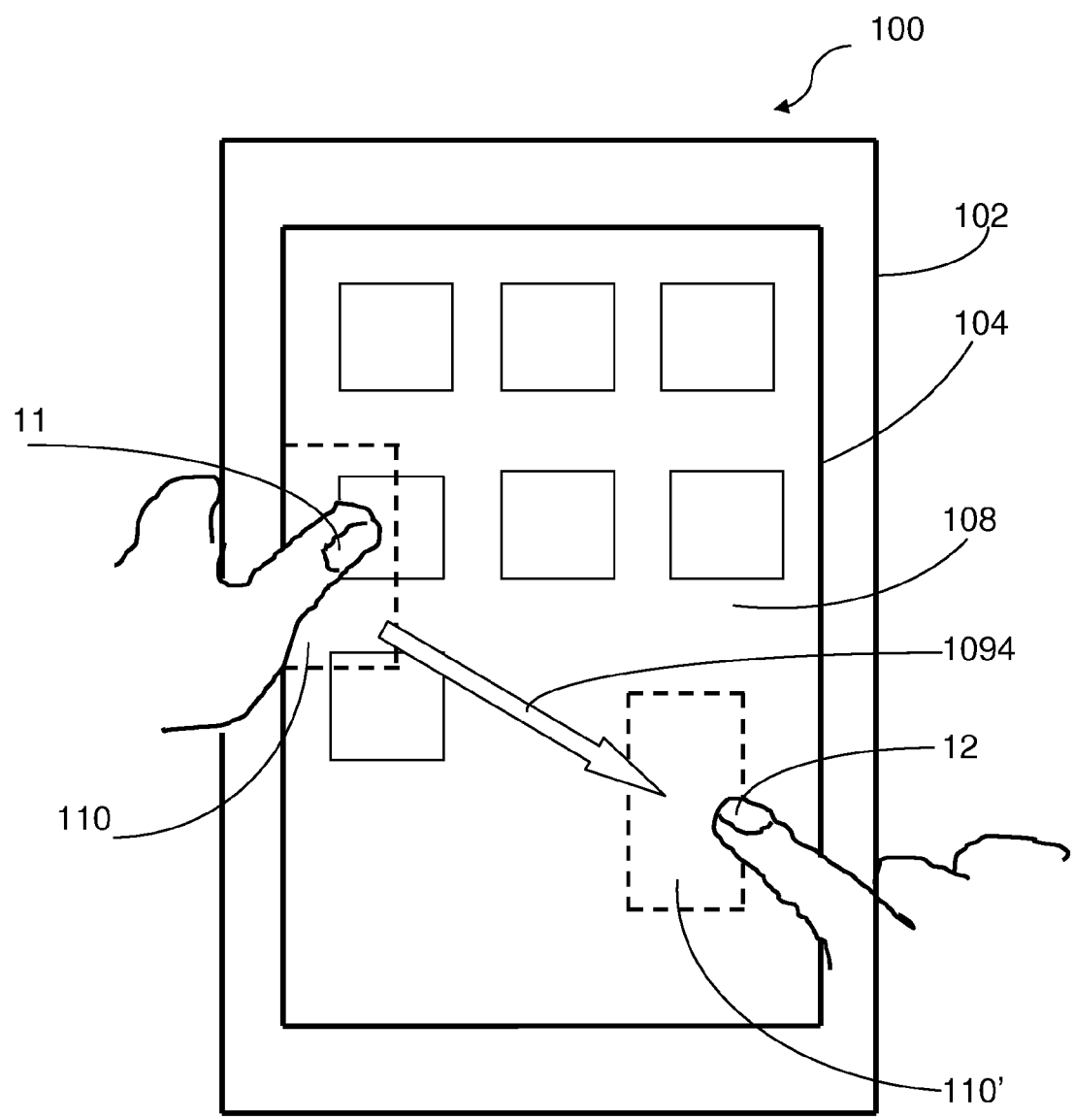
Figure 7:
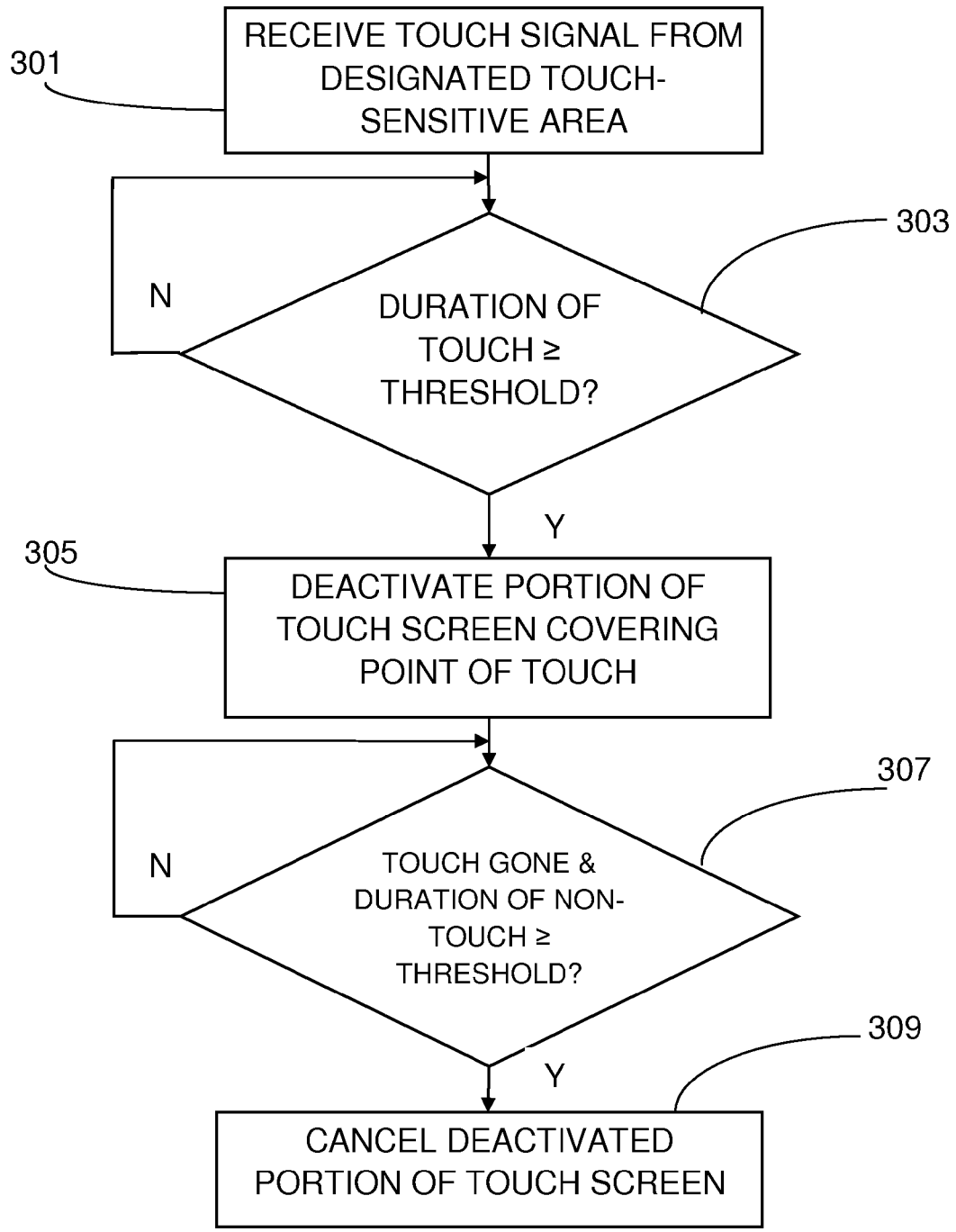
Figure 8:
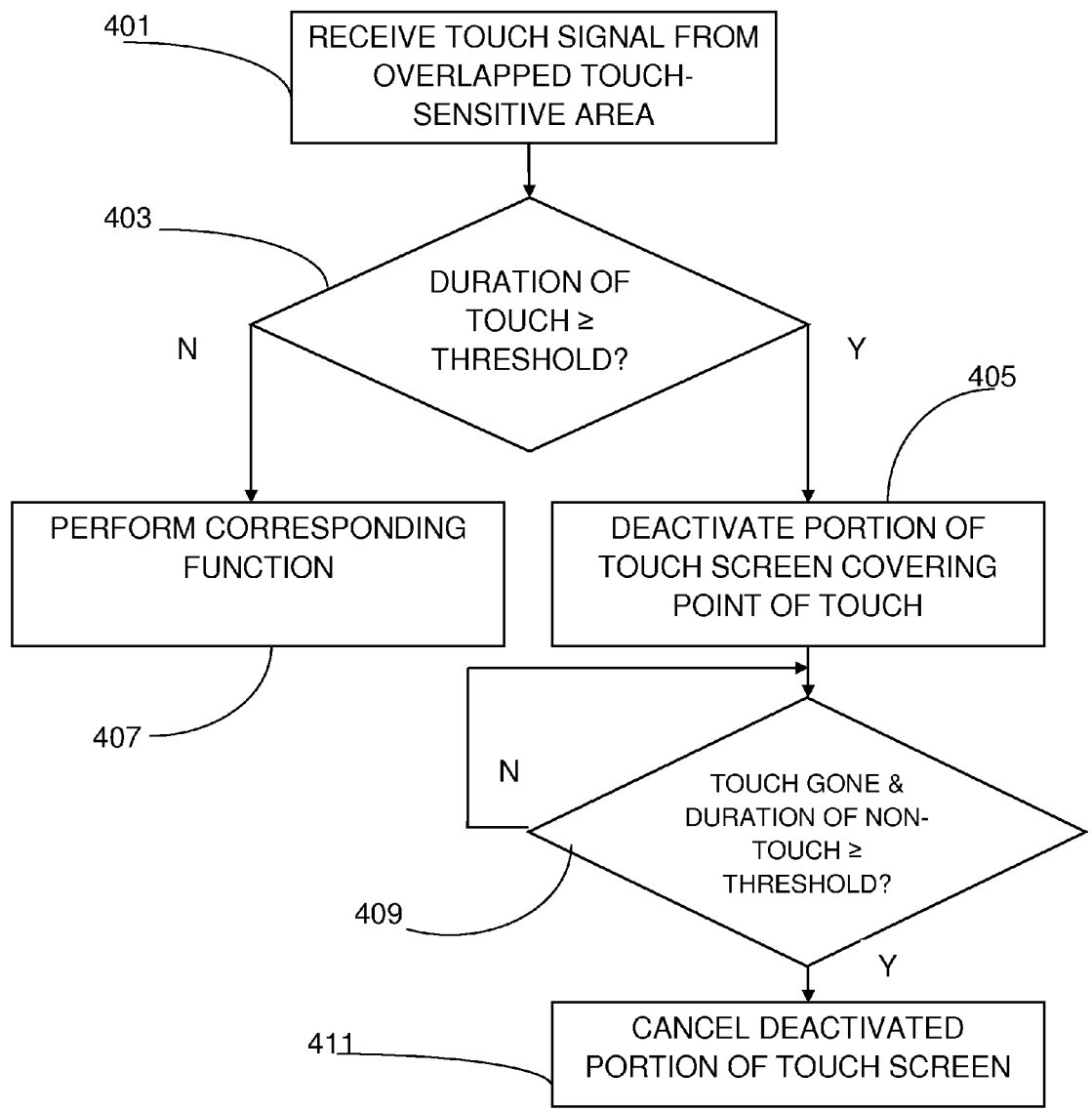
Figure 9:
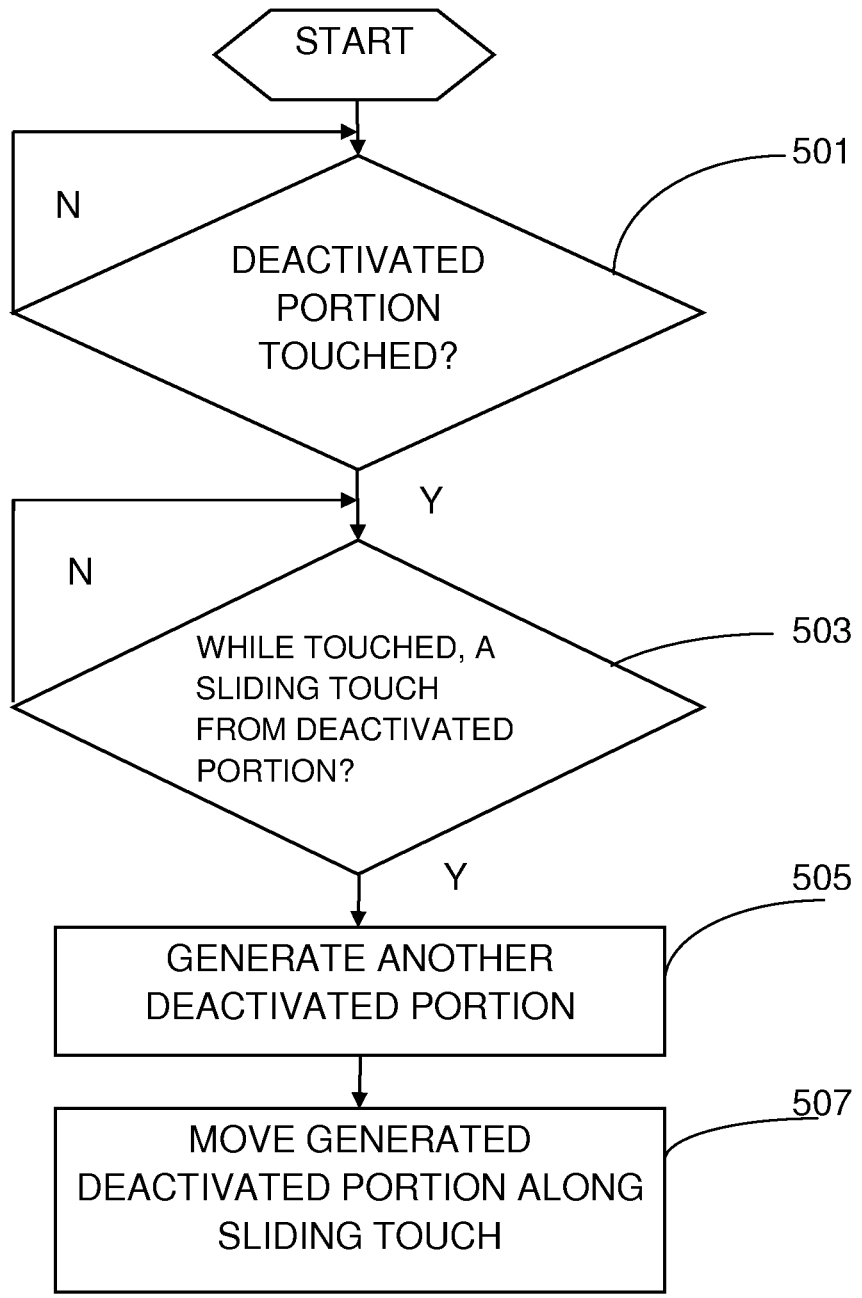
Figure 10:
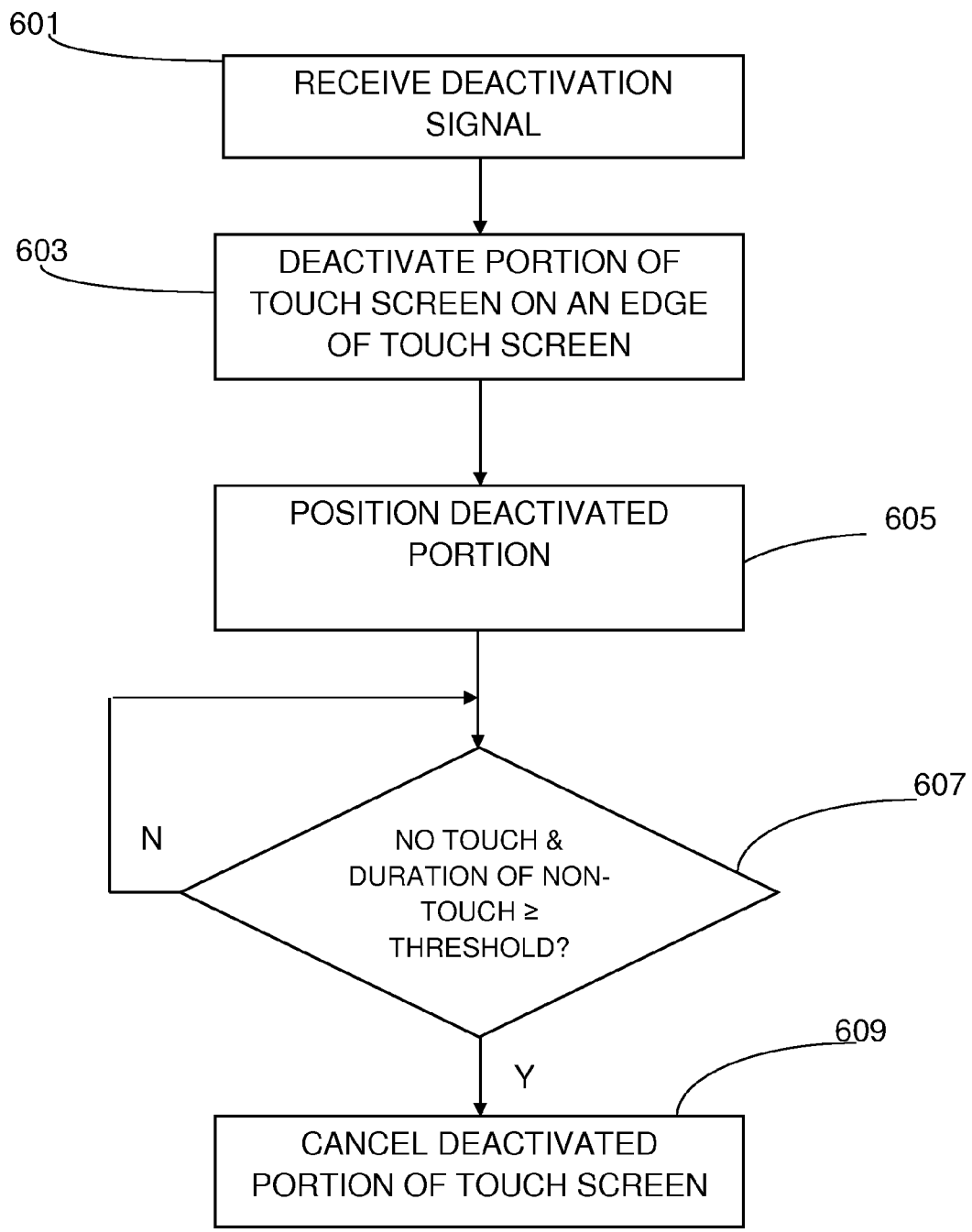
Figure 11:
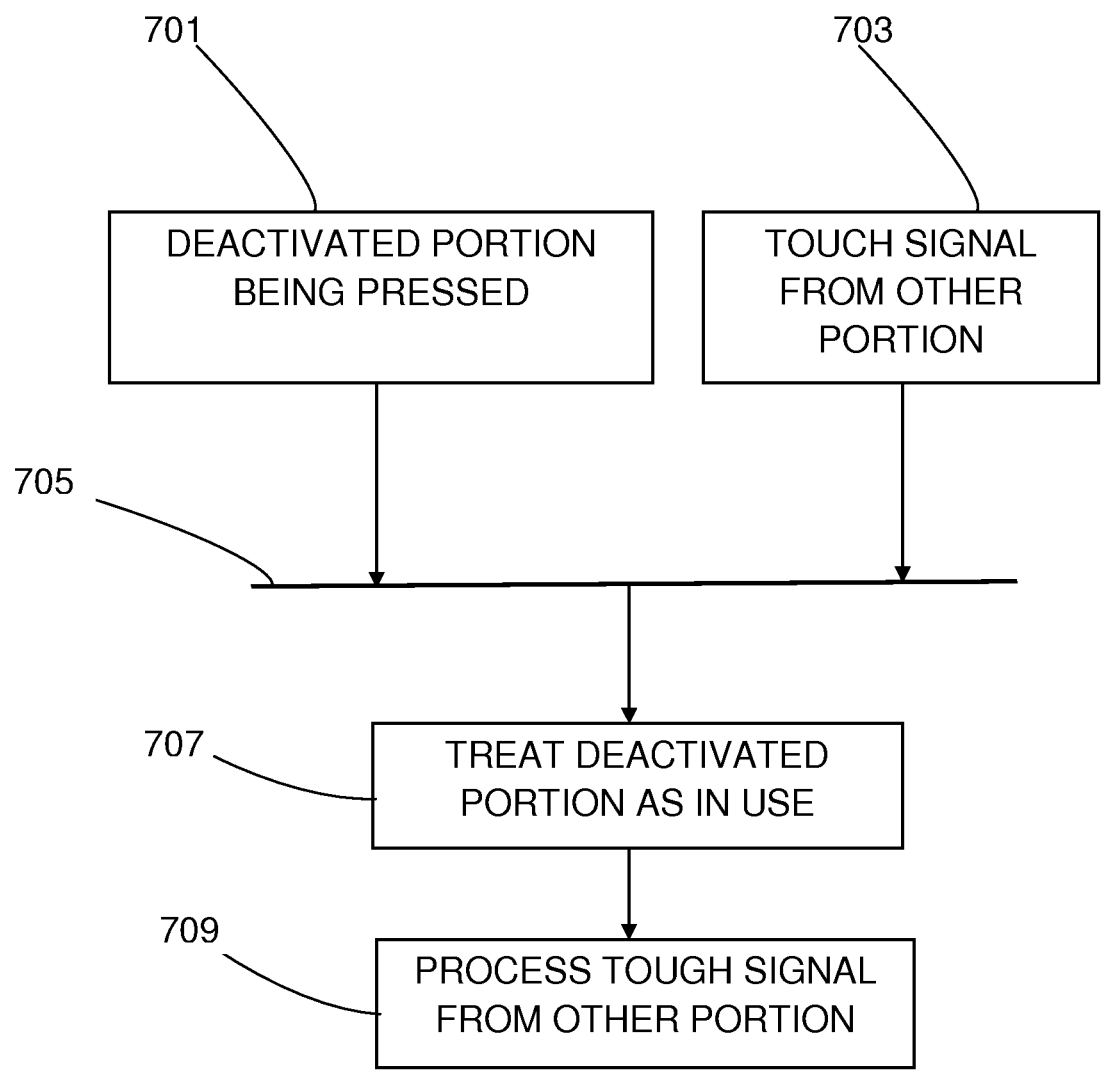
Figure 12:
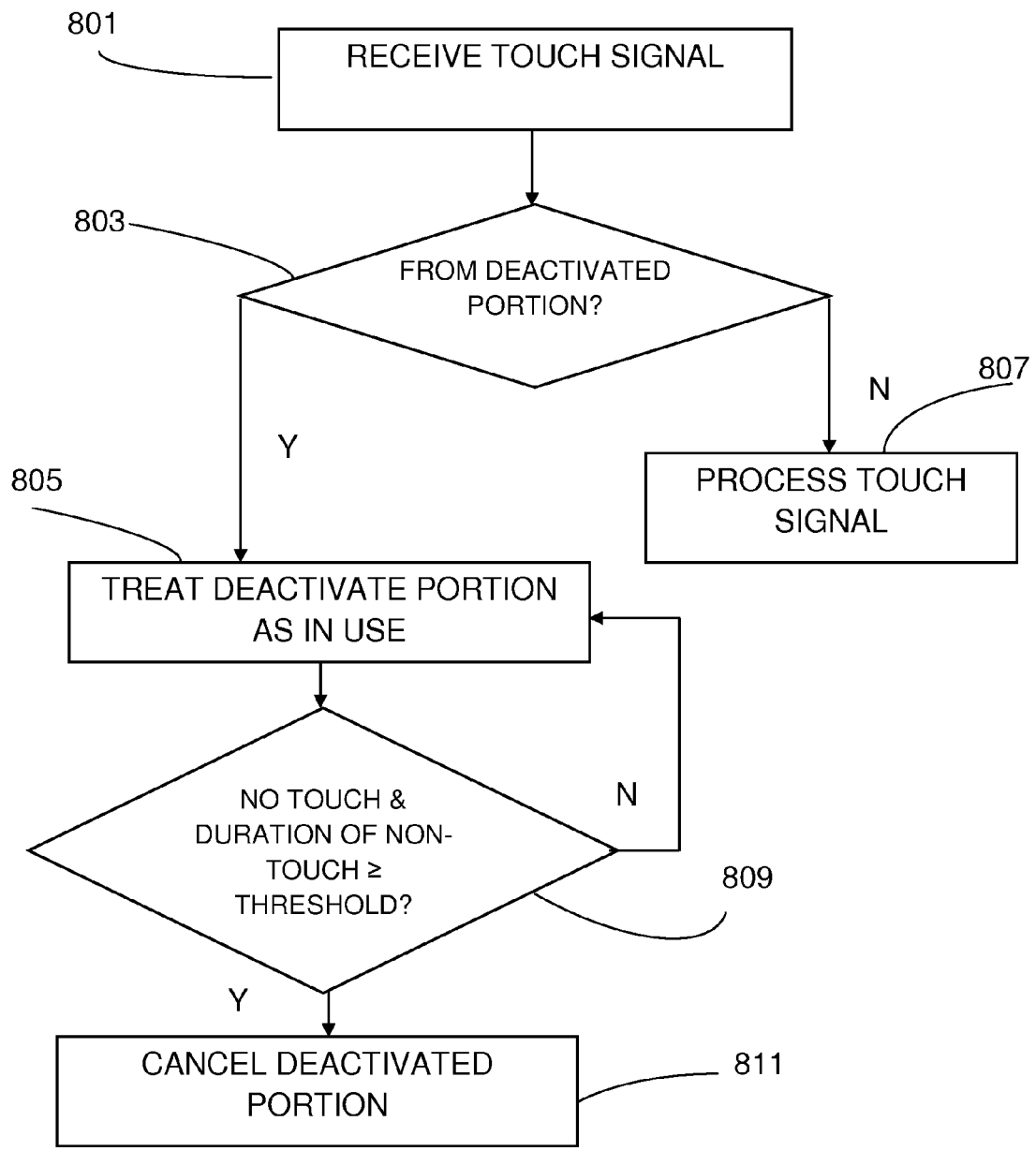

The foregoing and other exemplary purposes, aspects and advantages of the present invention will be better understood in principle from the following detailed description of one or more exemplary embodiments of the invention with reference to the drawings, in which:

FIG. 1, a schematic view, shows an exemplary embodiment of a device with touch screen held by a human hand and a deactivated portion of the touch screen;

FIG. 2, a schematic view similar to FIG. 1, shows designated touch-sensitive areas defined on the touch screen of the device of FIG. 1 for triggering the deactivated portion;

FIG. 3 is a schematic view showing the device of FIG. 1 with the deactivated portion rendered in another use situation, according to an embodiment;

FIG. 4, a block diagram, shows an exemplary embodiment of functional blocks of the device of FIG. 1;

FIG. 5, a schematic view, shows different embodiments in which a deactivated portion is generated, canceled and moved;

FIG. 6, a schematic view, shows cloning the deactivated portion and moving the cloned deactivated portion, in accordance with an embodiment;

FIG. 7 is a flowchart describing a method for triggering and cancelling the deactivated portion on the touch screen of the device of FIG. 1, in accordance with an embodiment;

FIG. 8, another flowchart, showing a method for triggering and cancelling the deactivated portion in another situation, according to another embodiment;

FIG. 9, a flowchart, illustrates an exemplary process of cloning a deactivated and moving a deactivated portion;

FIG. 10, a flowchart, illustrates a general process to render the deactivated portion on an edge of the touch screen of the device of FIG. 1, in accordance with an embodiment;

FIG. 11 is a flowchart showing a process in which, according to an embodiment, the device of FIG. 1 works while the deactivated portion is in use; and FIG. 12, another flowchart, shows how the device of FIG. 1 treats a touch signal from the touch screen, in accordance with an embodiment.

DETAILED DESCRIPTION OF THE INVENTION

The invention will now be described in detail through several embodiments with reference to the accompanying drawings.

Referring to FIG. 1, a device 100 with a touch screen 108 is demonstrated. On the touch screen 108, a number of touch-sensitive icons 106 are defined and displayed; each of them can be touched to trigger a corresponding function. A user of the device 100 may use his hand 10 to hold the device 10 from an edge thereof. To hold the device 100 comfortably, the thumb of the hand 10, or one of the phalanges of the thumb, may have to touch the touch screen 108, especially when edges 102 of the device 100 are close to edges 104 of the touch screen 108. To avoid accidental activations of those icons 106 adjacent to the edge 104 where the hand 10 holds the device 100, a deactivated portion 110 on the touch screen 108 is rendered to cover the area where the hand 10 touches the touch screen 108. In one embodiment, the deactivated portion 110 may be semi-transparent, or transparent to see through the content under the deactivated portion 104. The deactivated portion 110 can be visible to the user either by its opacity or having a visible border such that the user can easily figure out where it is in order to rest his thumb on it.

Referring to FIG. 2, designated touch-sensitive areas 112 can be rendered on the touch screen 108 to be used to triggering the rendering of the deactivated portion 110. In the embodiment depicted by FIG. 2, the touch-sensitive areas 112 are elongated rectangular areas located between the edges 104 of the touch screen 108 and the icons 106 that are close or the closest to the edges 104. The touch-sensitive areas 112 could be transparent or semi-transparent such that the contents under the touch-sensitive area 112 can be seen.

As shown in FIG. 4, in one embodiment, the device 100 includes the touch screen 108, a processor module 201 connected to and controlling the touch screen 108, and a signal receiving module 203 connected to both the touch screen 108 and the processor module 201. When an object, such as a human thumb, touches one of the designated touch-sensitive areas 112, the designated touch-sensitive area 112 senses the touch. Here, the touch can be a gesture of touching and holding for a certain period of time, or a tap, or a tap with certain period of time of touching one of the designated touch-sensitive areas 112. The signal receiving module 203 receives a touch signal from the designated touch sensitive area 112, and transfers the signal to the processor module 201. The processor module 201 processes the signal and controls the touch screen 108 to render the deactivated portion 110 on the touch screen covering the point of the touch, or an area of the touch, where the touching object contacts the touch screen 108. In one embodiment, the processor module 201 determines whether the touch has reached a predetermined period of time to be a deactivation signal, or a first signal, required to trigger the rendering of the deactivated portion 110. The processor module can include a processor 2011 and various control modules controlled by the processor 2011 and known in the art and suitable for controlling a touch screen that are not described here in detail. The processor 2011 may be an x86 CPU, an ARM chip, or any other processor suitable for being used to control the touch screen 108 via the various controls modules that may be either hardware or software modules, as known at the time of this invention.

The device 100 may further have a storage unit 205, as shown in FIG. 4, connected to and accessed by the processor module 201, to store various parameters used in rendering the deactivated portion 110. The parameters may include a first period of time 2051, a second period of time 2052. When one of the designated touch-sensitive areas 112 has been touched at a point of the touch 114 by the hand 10 as shown in FIG. 3 for period of time equal to or longer than the first period 2051, the period of touch is sensed, together with the touch signal by the signal receiving module 203, and the processor module 201 will determine that the touch signal is the first signal (deactivation signal) meant for requesting for a deactivated portion 110, and will control the touch screen 108 to render the deactivated portion 110 covering the point of the touch 114. As long as the deactivated portion 110 is being touched, e.g., by the hand 10 of the user pressing and holding the deactivated portion 110, the processor module 201 will control the touch screen 108 to maintain the deactivated portion 110 on the touch screen 108.

While the deactivated portion 110 is being displayed on the touch screen 108, and has no longer been touched for a period of time equal to or longer than the second period 2052, in other words, the deactivated portion 110 is no longer being used by the user to hold the device 100, the processor module 201 will treat this situation as that the deactivated portion 110 is no longer needed, and therefore cancel the deactivated portion 110 from the touch screen 108.

In another embodiment, the deactivated portion 110 can be generated by the processor module 201 on the touch screen 108 based on the deactivation signal (the first signal) to generate such a deactivated portion 110, together with generation of the whole interface, or other icons 106. This way, there is no need for the user of the device to trigger the rendering of the deactivated portion 110, or the first signal is not generated by a touch signal but by a system setting. The position or initial position of the deactivated portion 110 can be determined by a position parameter 2056 stored in the storage 205, the position may be "left, middle," "right, bottom," here the "right" may indicate the right edge of the touch screen 108, and "middle" may indicate the middle portion of the right edge, and so on. The position parameter 2056 may be input by the user and stored in the storage unit 205.

In addition, other parameters about the deactivated portion 110 may also stored in the storage unit 205 and accessed by the processor module 201. Such as sizes 2053, opacity 2054, and shapes 2055, as shown in FIG. 4. These parameters can be used in rendering the deactivated portion 110 to determine the look and feel of the deactivated portion 110.

In a situation that one of the designated touch-sensitive areas 112 is close to or even overlaps a touch-sensitive area, i.e., a hyper link 116 as shown in FIG. 3 (or icons 106 in FIG. 1), and a touch point 114 might touches both the touch-sensitive area 112 and the touch-sensitive link 116. When this happens, the processor module 201 will determine whether the touch at the touch pint 114 is meant for triggering the deactivated portion 110, or triggering the link 116, based on the duration of the touch. If the duration of the touch is equal to or longer than the first period 2051, the touch signal is the first signal meant for a deactivated portion 110, otherwise, the processor module will determine that the touch signal is a second signal meant for activating the link 116, and perform a function associated with the link 116, in this specific case, opening the webpage linked by the link 116. Same thing is true, in case of a touch-sensitive icon 106, and the processor module 201 will perform a function behind the icon if the touch duration is less than the first period 2051.

In yet another embodiment, as shown in FIG. 5, the deactivated portion 110 may be triggered by a sliding touch on the touch screen 108. In FIG. 5, a sliding touch 1091 in a direction from an edge towards the middle of the touch screen 108 will be treated by the processor module 201 as the first signal being a trigger to render the deactivated portion 110 on the touch screen, and the deactivated portion 110 is positioned on the edge of the touch screen 108 covering part of the sliding trace the sliding touch 1091, e.g. at least the initial portion of the sliding touch 1091, as shown in FIG. 5. And once the deactivated portion has been rendered on the touch screen 108, another sliding touch 1092 on the deactivated portion 110 in a direction from the middle to the edge on the deactivated portion will be a signal to cancel the deactivated portion 110 by the processor module 201.

In an embodiment, once the deactivated portion 110 has been displayed on the touch screen 108, as the one shown on the left in FIG. 5, a touching gesture such as a holding and dragging one 1093 in FIG. 5 can be used to move the deactivated portion 110 to another location on the touch screen 108. For instance, the sliding touch 1093 can be one that the user using his finger first presses and holds the deactivated portion 110 on the left, then drags the deactivated portion 110 to the lower right edge of the touch screen 108 in FIG. 5. This way, the user can position the deactivated portion 100 wherever he wants to hold the device 100 with one of his thumbs resting on the deactivated portion 110.

Referring back to FIG. 4, the processor 2011 that can execute various control modules (those known in the arts, and not shown in details here and in the drawings) for the touch screen 108. For the instant invention, in one embodiment, the processor module 201 further includes a cloning module 2012 that clones an existing or currently displayed deactivated portion 110. Referring to FIG. 6, when the deactivated portion 110 has already been displayed on the touch screen 108, and a thumb 11 of the user is currently touching (pressing and holding) the deactivated portion 110, another object, e.g., a finger 12 of the other hand of the user, performs a sliding touch 1094 starting from the deactivated portion 110, in such situation, the signal receiving module 203 recognizes the touch pattern, i.e., one pressing and holding touch by the thumb 11, and a concurrent sliding touch 1094 by the finger 12, and sends corresponding signals to the processor module 201, the processor 2011 will then treat this combination of pressing and holding touch and the sliding touch 1094 as a third signal, and, based on the third signal, executes the cloning module 2012 to duplicate the deactivated portion 110 by creating a new deactivated portion 110' which is the same as or similar to the deactivated portion 110, e.g., in color, shape, size, opacity, etc. And furthermore, the processor module 201 will move the cloned deactivated portion 110' on the touch screen 108 along the path or trace of the sliding touch 1094 till the end of the sliding touch 1094 or to a point of the edges 104 of the touch screen where the sliding touch 1094 ends. As a result, there will be two separate deactivated portions 110 and 110' on the touch screen 108, and the user can use two hands to hold the device 100 comfortably, with, likely, the two thumbs respectively resting on the two deactivated portions 110 and 110'. In another embodiment, this process of cloning a deactivated portion, can be repeated again and again such that there can be more than two deactivated portions 110 and 110' on the touch screen 108, and cloning can start from the first deactivated portion 110, or from a later-cloned deactivated portion 110', i.e., cloning a cloned deactivated portion 110'. In an embodiment, based on FIG. 6, during the creation of the cloned deactivated portion 110', the deactivated portion 110 does not move or remains at its original or the same position, as shown FIG. 6, remaining under the thumb 11.

Referring to FIG. 7, a process of rendering the deactivated portion 110 is demonstrated in accordance with an embodiment. The figure, here, as well as FIGS. 8-12, later, shows only exemplary steps in an embodiment to describe the principles of the method, and the order of the steps is not necessarily fixed as shown, might be altered, and certain steps might be omitted without departing from the principles of the invention.

In step 301, the signal receiving module 203 receives a touch signal from the dedicated touch-sensitive area 112. In step 303, the processor module 201 determines whether the duration of the touch is equal to or longer than a threshold, e.g., the stored first period 2051. If the determination is positive, in step 305, the processor module 201 will treat the touch signal as the first signal and control the touch screen 108 to deactivate a portion of the screen which covers the point of the touch, e.g. the point of the touch 114 in FIG. 3. After the deactivated portion 110 has been rendered, and when the touch has gone, the signal receiving module 203 may sense that there is no touch, and the processor module 201 will calculate the duration of the non-touching. If, in step 307, the duration of the non-touching equals or exceeds a threshold, e.g., the second period 2052, in other words, the user may no longer need the deactivated portion 110, the processor module will, in step 309, control the touch screen to stop displaying the deactivated portion 110.

Referring to FIG. 8, together with FIG. 3, in case the point of the touch 114 is both on the dedicated touch-sensitive area 114 and on the active link 116 (or an icon 106 of FIG. 2), the processor module 201 will determine whether to render the deactivated portion 110, or trigger the link 116 (or the icon 106) as the user intends to. In step 401, the signal receiving module 203 receives a touch signal from the dedicated touch-sensitive area 112. In step 403, the processor module 201 determines whether the duration of the touch is equal to or longer than a threshold, e.g., the stored first period 2051. If the determination is negative, for example, the duration is less than the first period 2051, the processor module 201 will treat the touch signal as the second signal and perform a corresponding function of the link 116, e.g., opening the website linked by the link 116; however, if the determination is positive in step 405, the processor module 201 will control the touch screen 108 to display the deactivated portion 110 which covers the point of the touch, e.g. the point of the touch 114 in FIG. 3. After the deactivated portion 110 has been rendered, and when the touch has gone, the signal receiving module 203 may sense that there is no long a touch operation, and the processor module 201 will calculate the duration of the non-touching. If the duration of the non-touching equals or exceed a threshold, e.g., the second period 2052 in step 409, in other words, the user may no longer need the deactivated portion 110, in step 411, the processor module will control the touch screen to stop displaying the deactivated portion 110.

Referring to FIG. 9, together with FIG. 6, when a deactivated portion 110 is being displayed on the touch screen 108, a process of generating the new deactivated portion 110' can be achieved as follows. In step 501, if the deactivated portion 110 is being touched (pressing and holding), the signal-receiving module 203 will send the touch signal to the processor module 201, and in step 503, if the sliding touch 1094 is further received by the signal receiving module 203 on the deactivated portion 110, the processor 2011 will treat the combination of the pressing and holding touch and the sliding touch 1094 as the third signal and, in step 505, controls the cloning module 2012 to duplicate the deactivated portion 110 such that a new deactivated portion 110' is created and moves the new deactivated portion 110' along the trace of the sliding touch 1093.

An deactivation signal for deactivating a portion of the touch screen 108, i.e., the first signal, can be generated in different ways other than by a user touching the touch screen 108, for instance, by a direct user input to the device 100 via a button, or via a wireless signal. FIG. 10 describes a generic process for deactivating a portion of the touch screen 108. In step 601, the processor module 201 determines that a deactivation signal, i.e. the first signal, has been received. In step 603, the processor module 201 controls the touch screen 108 to deactivate a portion of the screen. In step 605, the processor module 201 positions the deactivated portion 110 according to a predetermined position that usually at a edge 104 of the touch screen 108 for the thumb 11 to rest on. It is also possible that the deactivated portion 110 also covers a point of the touch, e.g. the point of the touch 114 in FIG. 3 that generated the first signal. After the deactivated portion 110 has been rendered and positioned, and when the touch has gone, as detected by the signal receiving module 203, in step 607, and the processor module 201 will calculate the duration of the non-touching. If, in step 607, the duration of the non-touching equals or exceeds a threshold, e.g., the second period 2052, in other words, the user may no longer need the deactivated portion 110, the processor module will, in step 609, control the touch screen to stop displaying the deactivated portion 110.

Once the deactivated portion 110 has been rendered on the touch screen 108, it can be pressed by the thumb 11, meanwhile, the user can still operate icons 106 on the touch screen or other links 116. As shown in FIG. 11, touch signals can be received by the processor module 210 from the deactivated portion 110 as in step 701, and meanwhile, from other portions of the touch screen in step 703, as indicated by the timeline 705. In step 707, the processor module 210 will treat the touch signal from the deactivated portion 110 by pressing as indication that the deactivated portion is still in use, and in step 709, processes the touch signal from the other portions as conventional touch signals and responds to the touch signal by performing corresponding functions, such that the device 100 can be held firmly by the thumb resting on the deactivated portion 110, and at the same time the icons 106 or any links 116 on the touch screen 108 can be operated normally.

In yet another exemplary situation as described in FIG. 12, after the deactivated portion 110 or the cloned portion 110' has been rendered on the touch screen 108, the processor module 210 receives a touch signal from the touch screen 108 in step 801. The processor module 210 determines, in step 803, whether the touch signal is from the deactivated portion 110 or not. If the touch signal is from a portion of the touch screen 108 other than the deactivated portion 110 or the cloned portion 110', the touch signal will be processed and responded to normally and corresponding functions will be performed. However, if the touch signal is from the deactivated portion 110, or the cloned portion 110', the processor module will treat the touch signal as an indication that the deactivated portion 110 or the cloned portion 110' is still in use in step 805. In step 809, when the deactivated portion 110 or 110' has no longer been touched or pressed for the predetermined second time period 2052, the processor module 210 will control the touch screen 108 to cancel the deactivated portion 110 or the cloned portion 110'. Alternatively, if any one of the deactivated portion 110 or the cloned portion 110' is still in use, all the deactivated portions 110 and 110' will be kept on the touch screen 108, and only when all of the all the deactivated portions 110 and 110' have not been used for the second time period 2052 or more, the deactivated portions 110 and 110' will be cancelled.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A method for deactivating part of a touch screen of a device, comprising:
providing a processor module controlling the touch screen;
deactivating a portion of the touch screen by the processor module upon a condition that a first signal is received by the processor module; and
creating another deactivated portion separate from the deactivated portion upon a condition that a combination of a sliding touch being performed on the deactivated portion and a concurrent pressing and holding touch being performed on the deactivated portion is recognized by the processor module as a signal for creating the another separate deactivated portion while the deactivated portion remains at a same position, thus the deactivated portion and the another separate deactivated portion co-existing, wherein the another separate deactivated portion has a same size, a same shape, a same color and same opacity as the deactivated portion.

2. The method of claim 1, further comprising:
providing a signal receiving module connected to the touch screen and the processor module;
receiving a touch signal from a touch on the touch screen by the signal receiving module;
determining by the processor module whether the touch signal is the first signal; and
positioning the deactivated portion covering a point of the touch.

3. The method of claim 2, further comprising:
rendering a first touch-sensitive area on the touch screen; and
determining that the touch signal is the first signal upon a condition that the touch is on the first touch-sensitive area and a duration of touch reaches a predetermined first period of time.

4. The method of claim 3, further comprising:
upon a condition that the first touch-sensitive area overlaps a second touch-sensitive area of the touch screen, and the point of touch is located at an overlapping point of the first and the second touch-sensitive areas, determining that the touch signal is a second signal to activate the second touch sensitive area upon a condition that the duration of the touch is less than the predetermined first period of time.

5. The method of claim 2, further comprising:
rendering the deactivated portion to cover an area on the touch screen extending from an edge of the touch screen closest to the point of touch to the point of touch.

6. The method of claim 2, further comprising:
upon a condition that another touch signal is received from a portion of the touch screen other than the deactivated portion while the deactivated portion is being touched, treating the deactivated portion as in use, and processing and responding to the another touch signal.

7. The method of claim 2, further comprising:
determining that the touch signal is the first signal upon a condition that the touch is a sliding touch originated from the edge of the touch screen and moving away from the edge.

8. The method of claim 1, further comprising:
cancelling the deactivated portion upon a condition that the deactivated portion has not been touched for a predetermined second period of time.

9. The method of claim 1, wherein the deactivated portion is semi-transparent such that content under the deactivated portion and on the touch screen can be seen.

10. The method of claim 1, the step of creating another deactivated portion comprising:
moving the another deactivated portion along a trace of the sliding touch such that the another deactivated portion is separate from the deactivated portion.

11. A method for deactivating part of a touch screen of a device, comprising:
providing a processor module controlling the touch screen;
deactivating a portion of the touch screen by the processor module upon a condition that a first signal is received by the processor module; and
creating another deactivated upon a condition that a combination of a sliding touch being performed on the deactivated portion and a concurrent pressing and holding touch being performed on the deactivated portion is recognized by the processor module as a signal for creating the another deactivated portion, thus the deactivated portion and the another deactivated portion co-existing;

keeping the deactivated portion at a same position; and moving the another deactivated portion along a trace of the sliding touch such that the another deactivated portion is separate from the deactivated portion, wherein the another deactivated portion has a same size, a same shape, a same color and same opacity as the deactivated portion.

12. The method of claim 11, further comprising:
positioning the deactivated portion on an edge of the touch screen.

13. A device, comprising:
a touch screen;
a processor module comprising a processor, and controlling the touch screen; and
a cloning module to be executed by the processor,
wherein, upon a condition that the processor module receives a first signal, the processor module deactivates a portion of the touch screen and positions the deactivated portion at a predetermined position of an edge of the touch screen; and
wherein, upon a condition that a combination of a sliding touch is being performed on the deactivated portion and a concurrent pressing and holding touch being performed on the deactivated portion is recognized by the processor module as a signal for creating another separate deactivated portion, the cloning module, controlled by the processor, creates the another deactivated portion of a same size, a same shape, a same color and a same opacity as the deactivated portion and the processor module moves the another deactivated portion along a trace the sliding touch, while keeping the deactivated portion at a same position, thus the deactivated portion and the another deactivated portion co-existing and separate from each other.

14. The device of claim 13, further comprising a signal receiving module connected with the touch screen and the processor module,
wherein the processor module renders a first touch-sensitive area on the touch screen; the signal receiving module receives a touch signal from a touch on the first touch-sensitive area and sends the touch signal to the processor module; and processor module determines that the touch signal is the first signal if a duration of the touch reaches a predetermined first period of time, and further renders the deactivated portion covering a point of the touch in response to the first signal.

15. The device of claim 14, wherein, upon a condition that the signal receiving module detects that the deactivated portion has no longer been touched for a predetermined second period of time, the processor module cancels the deactivated portion.

16. The device of claim 14, wherein processor module further renders a second touch-sensitive area on the touch screen which overlaps the first touch-sensitive area; upon a condition that the touch is on an overlapping point of the first and the second touch-sensitive areas, the processor module determines that the touch signal is a second signal to activate the second touch area if the duration of the touch is less that the predetermined first period of time, and performs a function corresponding to the second touch-sensitive are in response to the second signal.

17. The device of claim 13, further comprising a storage unit accessed by the processor module and storing a plurality of parameters related to the deactivated portion, wherein the parameters comprise:
the predetermined first period of time;
sizes of the deactivated portion;
opacity of the deactivated portion;
shape of the deactivated portion; and
the predetermined position of the deactivated portion, and wherein the processor module renders the deactivated portion according to the parameters stored on the storage unit, and positions the deactivated portion according to the predetermined position.

18. The device of claim 13, wherein sizes of the deactivated portion are such that one of the phalanges of a human thumb can rest on the deactivated portion without activating the touch screen.

* * * * *